(12) United States Patent
Sherwin

(10) Patent No.: US 8,246,224 B2
(45) Date of Patent: *Aug. 21, 2012

(54) APPARATUS TO PROVIDE VARIABLE ILLUMINATED SIGNALS FOR THE PRESENCE OF BICYCLES AND OTHER VEHICLES

(76) Inventor: Gerald A. Sherwin, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,077

(22) Filed: Nov. 16, 2011

(65) Prior Publication Data

US 2012/0063153 A1    Mar. 15, 2012

Related U.S. Application Data

(63) Continuation of application No. 12/798,030, filed on Mar. 29, 2010, now Pat. No. 8,092,055.

(51) Int. Cl.
*F21V 33/00* (2006.01)

(52) U.S. Cl. .............. 362/473; 362/249.02; 362/249.03; 362/428; 362/431; 362/545; 280/288.4; 340/431; 340/432; 340/468

(58) Field of Classification Search ............. 362/249.02, 362/249.03, 427, 428, 431, 473–476, 523, 362/524, 528–530; 280/288.4; 340/431, 340/432, 468
See application file for complete search history.

(56) References Cited

U.S. PATENT DOCUMENTS

| | | | |
|---|---|---|---|
| 3,586,348 A | 6/1971 | Rich | |
| 3,862,410 A | 1/1975 | Maxwell | |
| 4,051,361 A | 9/1977 | Lichon et al. | |
| 4,309,741 A | 1/1982 | Smith | |
| 4,598,339 A | 7/1986 | Ainsworth | |
| 5,272,609 A * | 12/1993 | Nelson | 362/427 |
| 5,379,197 A | 1/1995 | Conyers et al. | |
| 5,418,697 A | 5/1995 | Chiou | |
| 5,823,653 A | 10/1998 | Elam, Jr. et al. | |
| 7,232,244 B2 | 6/2007 | Naylor | |
| 7,367,700 B2 | 5/2008 | Chasmar | |
| 8,092,055 B2 * | 1/2012 | Sherwin | 362/473 |
| 2005/0024884 A1 | 2/2005 | Seminara et al. | |
| 2007/0035956 A1 | 2/2007 | Topps | |

* cited by examiner

*Primary Examiner* — Stephen F Husar

(74) *Attorney, Agent, or Firm* — Hahn Loeser & Parks, LLP; Carlos P. Garritano

(57) ABSTRACT

Microprocessor-controlled light emitting diode (LED) arrays are built into an extruded tubular lens within a mast that is connected to a base assembly. A means of mounting, which may be an adjustable clamp, permits the base assembly to be connected to a seat post or other mounting point on a bicycle or other vehicle. The tubular lens allows for substantial dispersion of light, and various light patterns produced by the arrays may be selected and those patterns alternated automatically to achieve greater visibility of the vehicle to surrounding motorists. A handle within the base assembly allows a rider to lower the mast from its vertical operating position easily and pivotally up to 90 degrees parallel to the longitudinal axis of the vehicle frame to facilitate mounting and dismounting the vehicle.

17 Claims, 10 Drawing Sheets

LIGHT PATTERNS

Pattern 1 = A,B,C,D,E   A,B,C,D,E   A,B,C,D,E
Pattern 2 = C,BD,AE   C,BD,AE   C,BD,AE
Pattern 3 = A,B,C,D,E,D,C,B   A,B,C,D,E,D,C,B   A,B,C,D,E,D,C,B

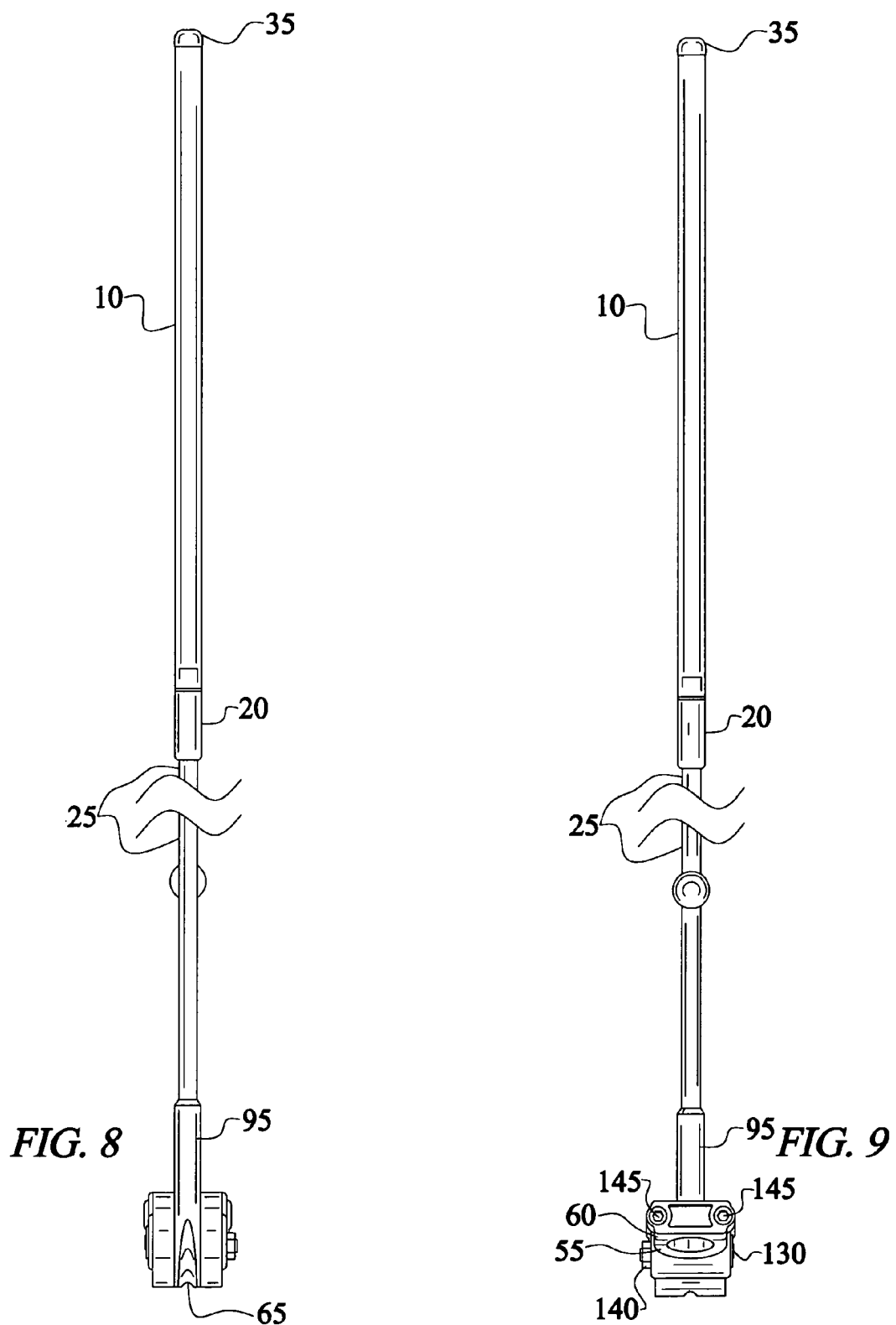

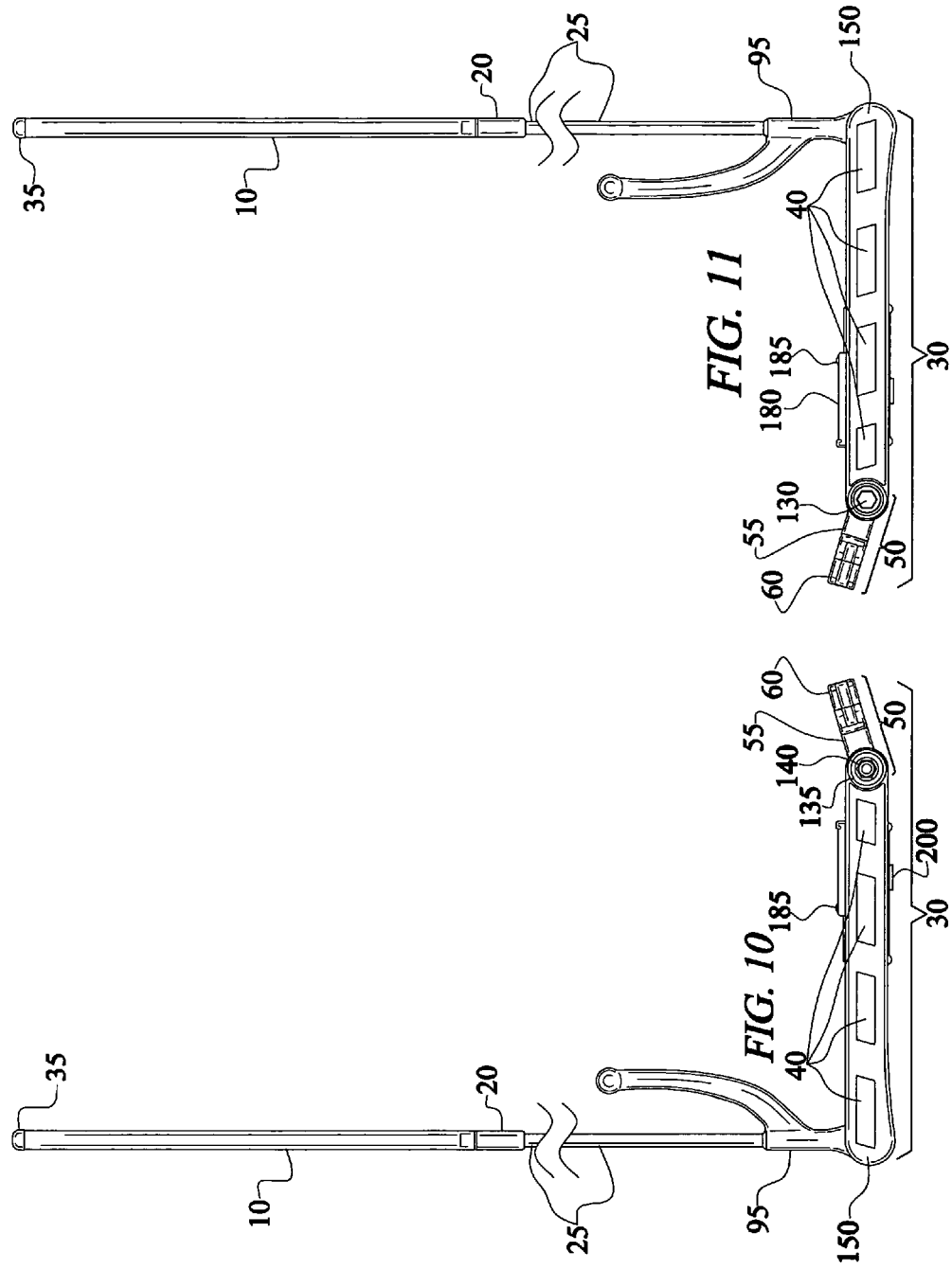

APPARATUS TO PROVIDE VARIABLE ILLUMINATED SIGNALS FOR THE PRESENCE OF BICYCLES AND OTHER VEHICLES

CROSS-REFERENCE TO RELATED APPLICATIONS

This application is a Continuation Application that claims the benefit of U.S. patent application Ser. No. 12/798,030, now U.S. Pat. No. 8,092,055, filed Mar. 29, 2010, and entitled "APPARATUS TO PROVIDE VARIABLE ILLUMINATED SIGNALS FOR THE PRESENCE OF BICYCLES AND OTHER VEHICLES." The entirety of the aforementioned application is incorporated herein by reference.

TECHNICAL FIELD

This invention relates to the field of illuminated vehicle safety lights supported by a vehicle structure, such as a bicycle seat post.

BACKGROUND

Bicycling is both a popular form of transportation as well as a ubiquitous sporting and recreational activity. In the absence of designated off-road bike paths, bicyclists must share the public roads and highways with motor vehicles of all types. Due to their relatively small size in relation to cars, SUVs, vans, trucks, and similar motor vehicles, bicycles are often difficult to see, especially at night, resulting in needless collisions between motor vehicles and bicycles and consequent injury or even loss of life.

Motorcycles, mopeds, scooters, ATV s, and similar vehicles, too, have become popular forms of transportation, sport, and recreation. Like bicycles, their relative size often makes them difficult to spot both in daylight hours, at dawn and dusk, and at night. Also like bicycles, a rider typically mounts them by hiking a leg over the rear frame of the vehicle behind the seat.

These vehicles employ various illuminated safety devices to increase their visibility to surrounding motorists. Such devices are superior to retro-reflector-based products because they virtually always make the presence of the vehicle identifiable from a greater distance, producing uniform light intensity without regard to illumination from a headlight or other source and without regard to the angle of incidence from that source.

Among the most effective of these devices are those which employ vertically disposed lights, mounted to upright poles or masts, which extend above the head of a bicyclist, motorcyclist, or other vehicle rider. Such an arrangement maximizes the visibility of the rider to surrounding motorists.

Existing devices of this nature, however, are typically affixed to the frame of the vehicle immediately behind the seat or adjacent to the seat, if not affixed to the seat itself, in a permanently upright position. As riders of bicycles, motorcycles, and similar vehicles ordinarily mount the vehicle by hiking one leg over the rear frame of the vehicle, these fixtures make getting on or off bicycles, motorcycles, or similar vehicles difficult. They provide no ready means of lowering and raising the pole or mast so that the rider may easily mount and dismount the vehicle in the conventional manner.

SUMMARY

The present invention comprises microprocessor-controlled light emitting diode (LED) arrays built into an extruded tubular lens within a mast that is mounted to a base assembly. An adjustable clamp permits the base assembly to be connected to a seat post or other mounting point on a bicycle or other vehicle. The tubular lens allows for substantial dispersion of light and therefore greater visibility of the vehicle to surrounding motorists, and various light patterns produced by the arrays may be selected. A handle within the base assembly allows a rider to lower the mast from its vertical operational disposition easily and pivotally up to 90 degrees parallel to the longitudinal axis of the vehicle frame to facilitate mounting and dismounting the vehicle.

BRIEF DESCRIPTION OF THE DRAWINGS

FIG. 8 is a rear end view of said embodiment of the invention, facing the detent joint.

FIG. 9 is a front end view of said embodiment of the invention, facing the seat post clamp.

FIG. 10 is a right side view of said embodiment of the invention.

FIG. 11 is a left side view of said embodiment of the invention.

REFERENCE NUMERALS IN THE DRAWINGS

Figure 1:
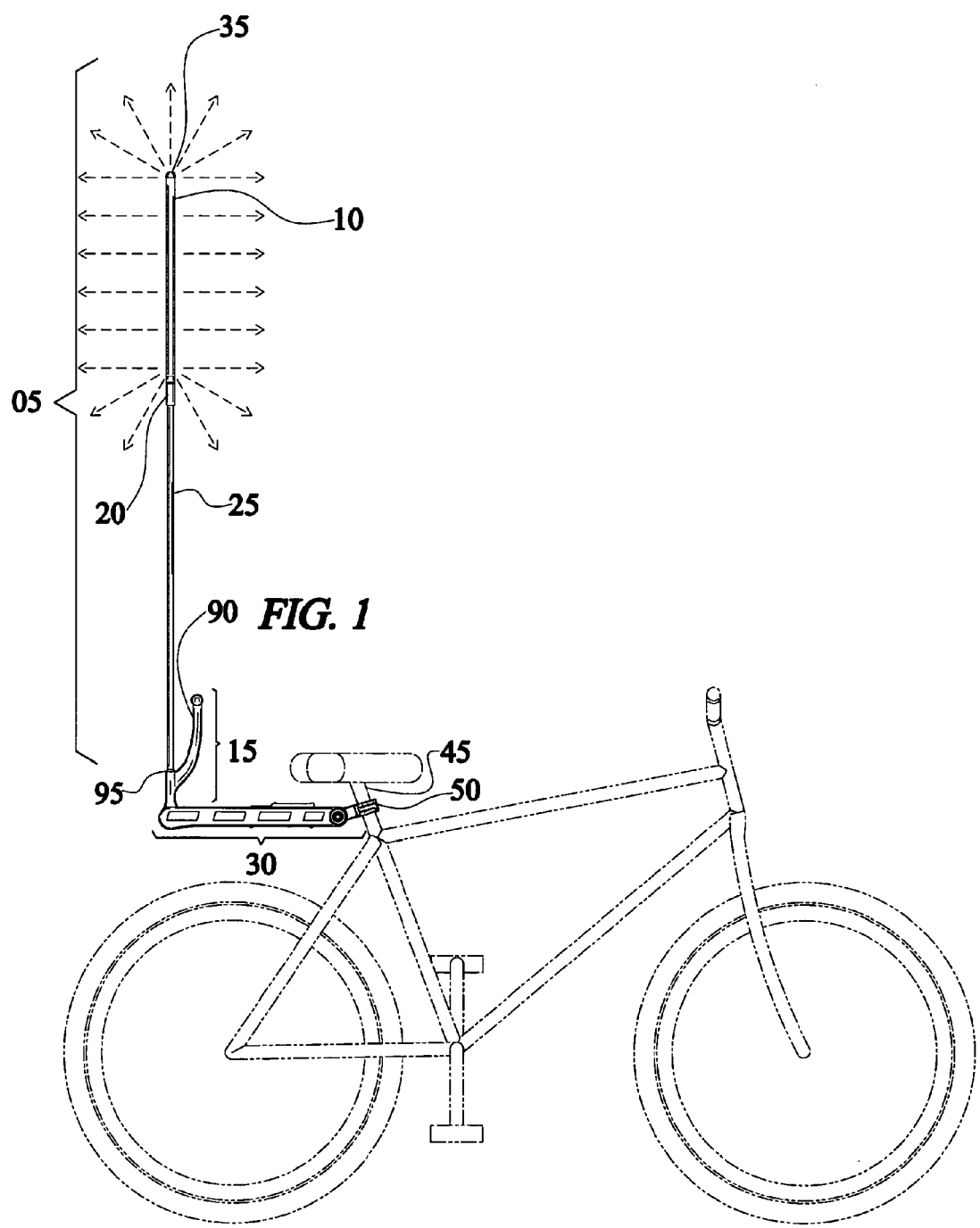
FIG. 1 is a right side view of a bicycle to which one embodiment of the present invention is attached.

05 Mast
10 Extruded tubular lens
15 Handle member
20 Mast connector
25 Mast extension tube
30 Base assembly
35 Mast cap
40 Reflective graphics
45 Seat post
50 Seat clamp assembly
55 Seat clamp
60 Clamp cap
65 Detent joint
70 Array of paired light emitting diodes (LEDs)
75 Nine-volt battery
80 Printed Circuit Board (PCB)
85 Cable connector
90 Position handle
95 Mast mount 100 Notched wheel
105 Spring plunger
110 Wear plate
115 Main truss
120 Secondary truss
125 Hi-Low Thread Forming Screw
130 Hex bolt
135 Flat washer
140 Jaw nut
145 Head Sock Cap Screws (HSCS)
150 Reflective overlays
155 Control box
160 Upper segment
165 Lower segment
170 PWA
175 Battery compartment wall
180 Battery cover
185 Removable screw
190 Cable
200 Switch

DETAILED DESCRIPTION

The present invention comprises a mast, with an integrated illuminable extruded tubular lens, connected to a base assembly. The base assembly may, in turn, be connected by various mounting means to a mounting point on a vehicle. By means of a handle, the mast may be lowered pivotally to allow the vehicle rider to mount and dismount the vehicle readily and easily.

Figure 3:
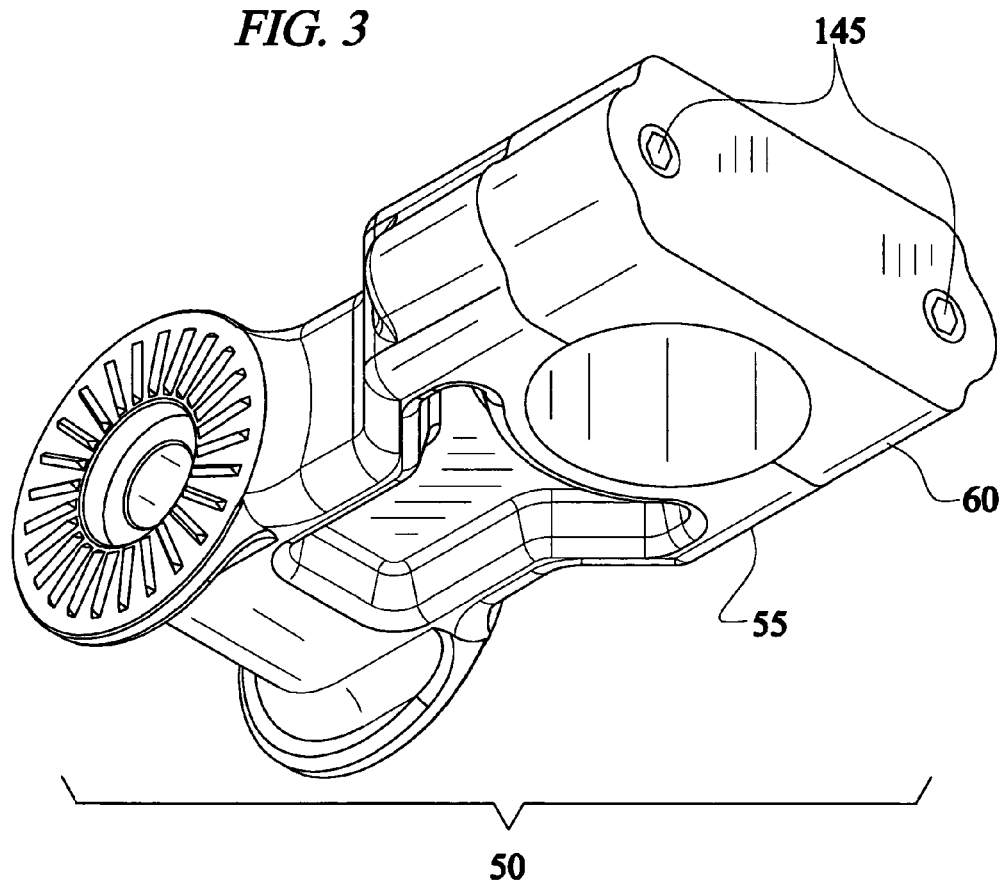
FIG. 3 is a close-up bottom front perspective view of the seat clamp member of the base assembly.

One possible embodiment of the instant invention, for use with a bicycle, is illustrated in the accompanying drawings. FIG. 1 displays a bicycle with an adjustable seat post 45. The seat post 45 serves as a mounting point for the base assembly 30, which attaches to the seat post 45 by means of its integrated seat clamp assembly 50 (a close-up view of which is provided in FIG. 3). In the normal operating position, the mast 05 is vertically disposed as illustrated, maximizing visibility of the bicycle as the tubular lens 10 is elevated to its maximum height in relation to the bicycle. When used on other vehicles, such as, without limitation, motorcycles, mopeds, motor scooters, all terrain vehicles (ATVs), snowmobiles, or tractors, a mounting member other than a seat post may be employed as the point of connection between the base assembly and the vehicle. Connection means other than a clamp may be employed to attach the base assembly to a given mounting member of a vehicle.

Figure 2:
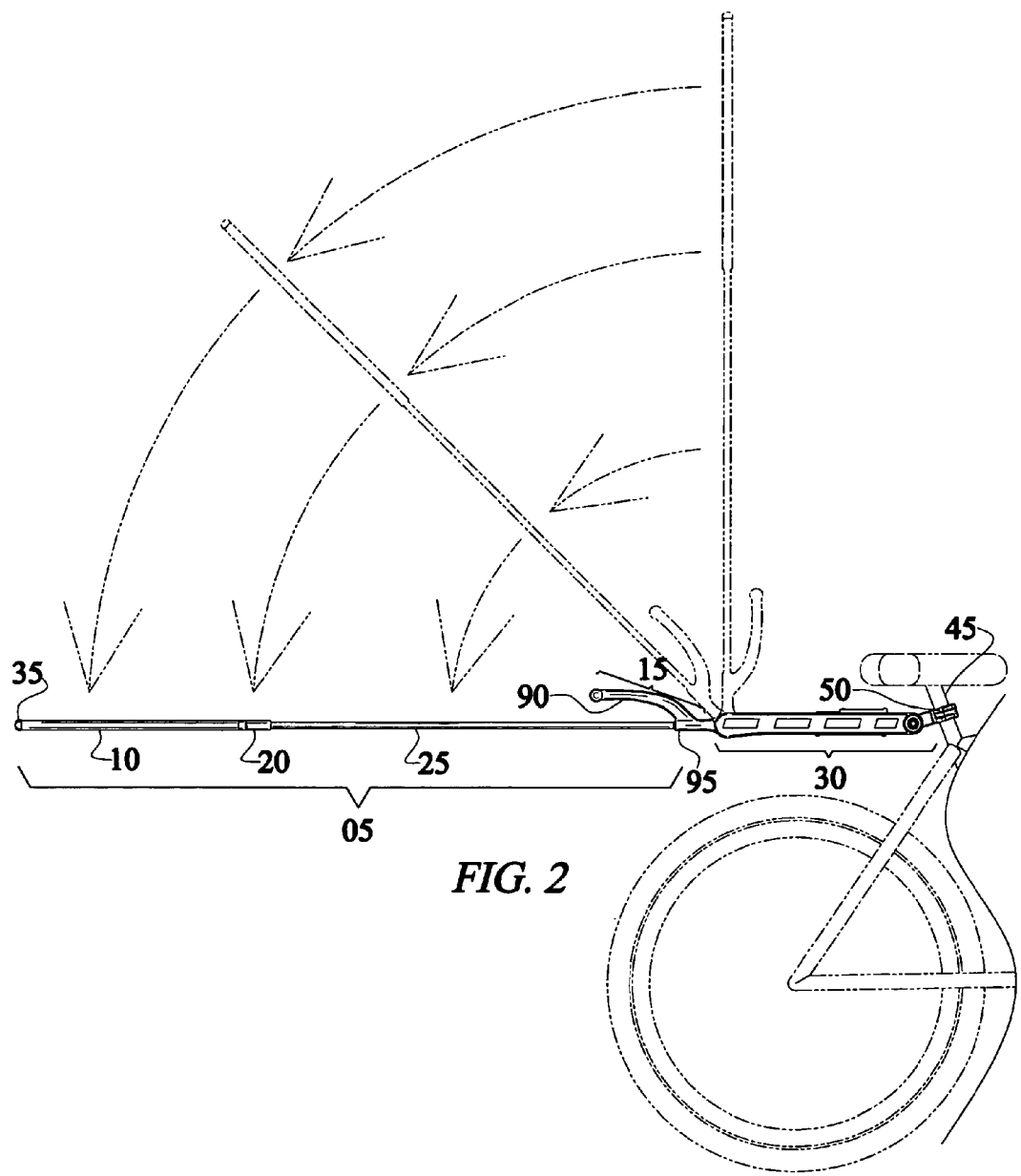
FIG. 2 is a right side view of said embodiment of the invention, attached to the seat post of a bicycle, in which a handle has been used to lower the mast approximately 90 degrees from an upright to a substantially horizontal position along the axis of the bicycle frame.
Figure 4:
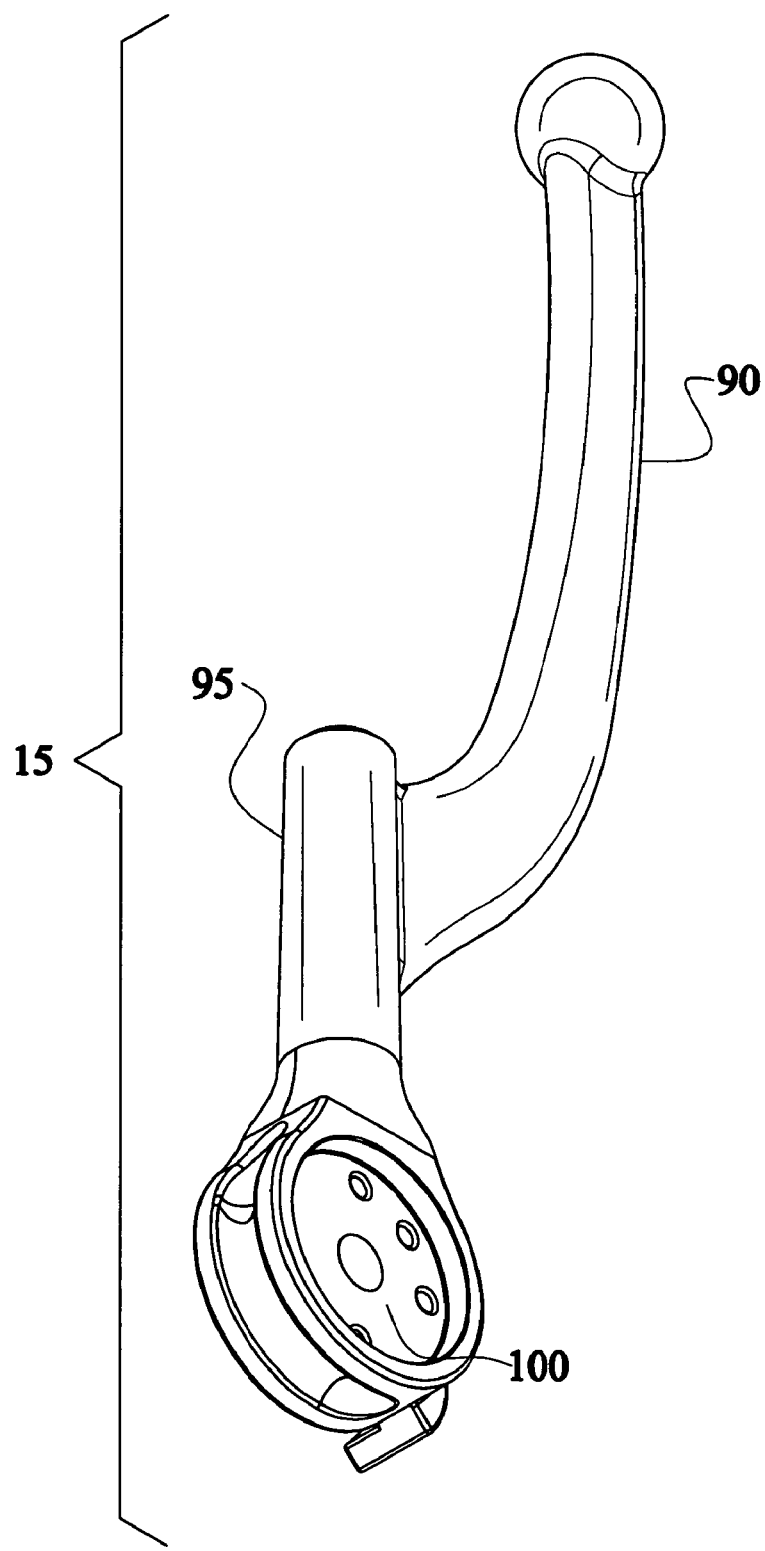
FIG. 4. is a close-up bottom rear perspective view of the handle member of the base assembly.

As shown in FIG. 2, the illustrated embodiment comprises a handle member 15 (a closeup view of which is provided in FIG. 4), including a position handle 90 and mast mount 95, incorporated into the base assembly 30, which the bicycle rider may use to pivot the mast 05 to a 45-degree angle and thence to a 90-degree angle. This innovation allows a rider to move the mast 05 to a horizontal position, parallel to the frame of the bicycle, to facilitate mounting and dismounting the bicycle, while maintaining the mast 05 securely in a vertical operating position while riding.

Figure 5:
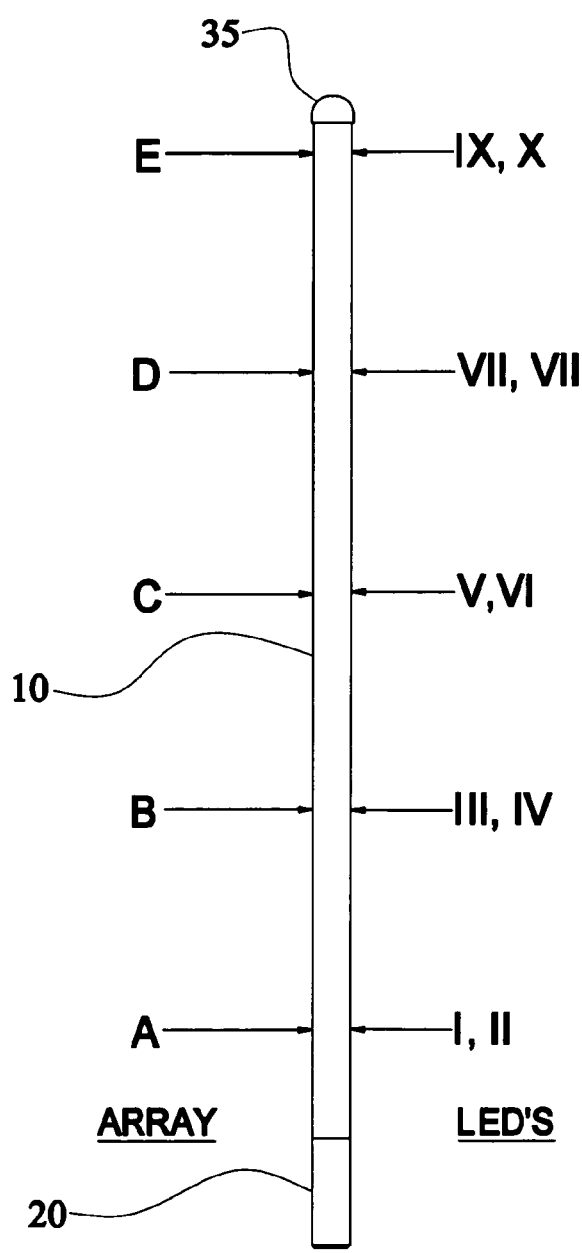
FIG. 5 reflects the relative positions of five arrays and ten LEDs within the lens in said embodiment of the invention and describes three of the many possible patterns for the display of the lights in each array.

FIG. 5 illustrates how different light patterns, calculated to promote and enhance visibility, are achieved in this embodiment of the present invention through the use of a programmable microprocessor embedded in a printed wiring assembly (PWA) within a control box. The patterns may be programmably reconfigured to optimize the visibility of the vehicle to which the apparatus is attached as field data are collected. Programming the microprocessor to alternate automatically among various patterns while the apparatus is powered on further enhances visibility of the vehicle.

Within the tubular lens 10, as shown in FIG. 5, are positioned five arrays, lettered A through E, of surface mounted technology (SMT) light emitting diodes (LED) in pairs, designated i and ii (the pair for A), iii and iv (the pair for B), v and vi (the pair for C), vii and viii (the pair for D) and ix and x (the pair for E). The color of the lights used in each array can be varied, and the arrays are spaced apart to enhance visibility at a distance. By way of example, but not limitation, levels A, C, and E could have LEDs in the amber to yellow range, while B and D could have LEDs in the green range, with each array being spaced between one to twelve inches from every immediately adjacent array (i.e., A from B, B from A and C, C from B and D, etc.). Three possible representative patterns are set forth at the top of FIG. 5.

The illustrated embodiment could be programmed to alternate automatically between the first such pattern, the second such pattern, and the third such pattern in any given order or time interval desired while the apparatus is powered on. Typically, the programming of given patterns and alternating sequences or combinations of patterns will be accomplished by a manufacturer, although a switch, knob, or other suitable selection means could be incorporated into the apparatus to allow a vehicle user to choose between various patterns or sequences and combinations of patterns, the range of which patterns, sequences, or combinations could be preselected by a manufacturer for their efficacy in achieving safety and overall visibility.

Figure 6:
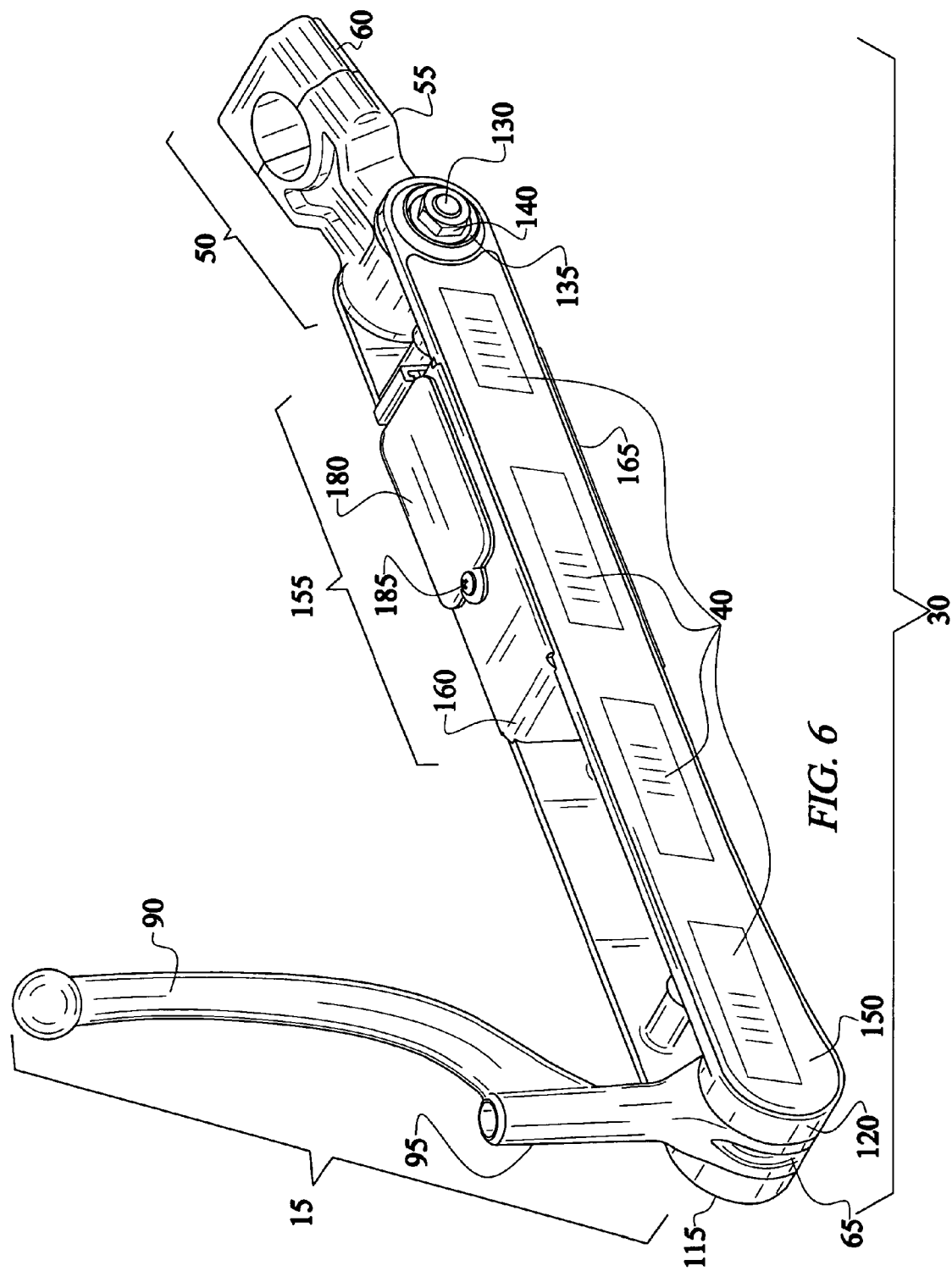
FIG. 6 is a close up elevated right rear perspective view of the features of the base assembly of said embodiment of the invention.
Figure 7:
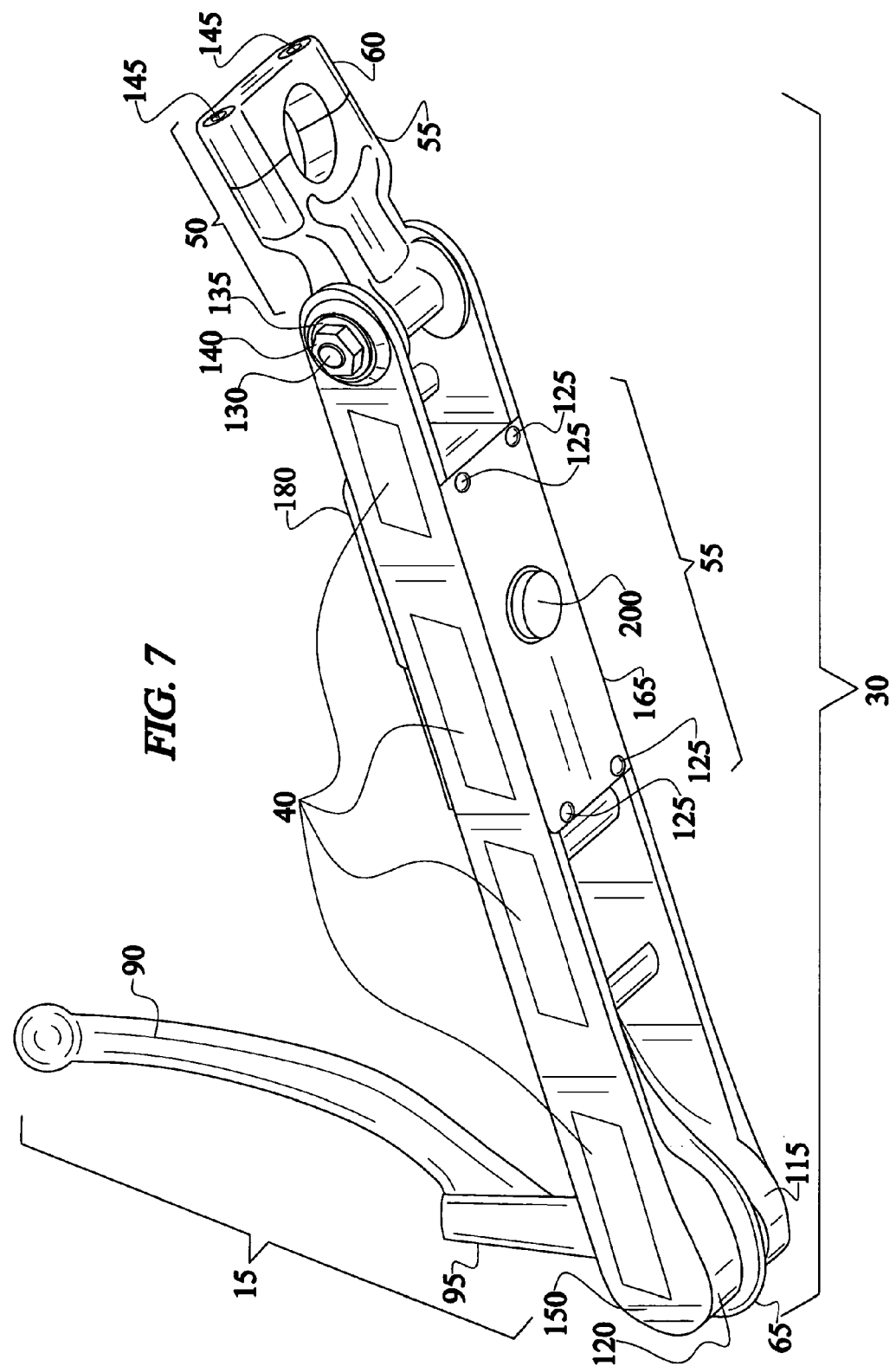
FIG. 7 is a close up right front underside perspective view of the features of the base assembly of said embodiment of the invention.

FIG. 6 and FIG. 7 present different close-up perspective views of the base assembly 30 without the mast connected. In FIG. 6 is presented a closeup right rear elevated perspective view of the base assembly 30. A control box 155 is situated between the seat clamp assembly 50 and the handle member 15 of the base assembly 30, within a main truss 115 and a secondary truss 120 that together join to form the base assembly 30 and contribute to form the control box 155. A close-up front underside perspective view of the base assembly 30 appears in FIG. 7. A button or switch 200 to activate the LEDs in the tubular lens of the mast can be positioned underneath the control box, as illustrated here, or in any other suitable location.

The end of the base assembly 30 into which the handle member 15 is integrated reflects the location of a detent joint 65 that enables the pivoting of the mast. At the opposite end of the base assembly 30 is located the seat clamp assembly 50. FIG. 8 and FIG. 9 present end views of this embodiment of the invention, while FIG. 10 and FIG. 11 reflect side views of said embodiment and provide further detail for the location of its various elements in relation to one another.

Figure 12:
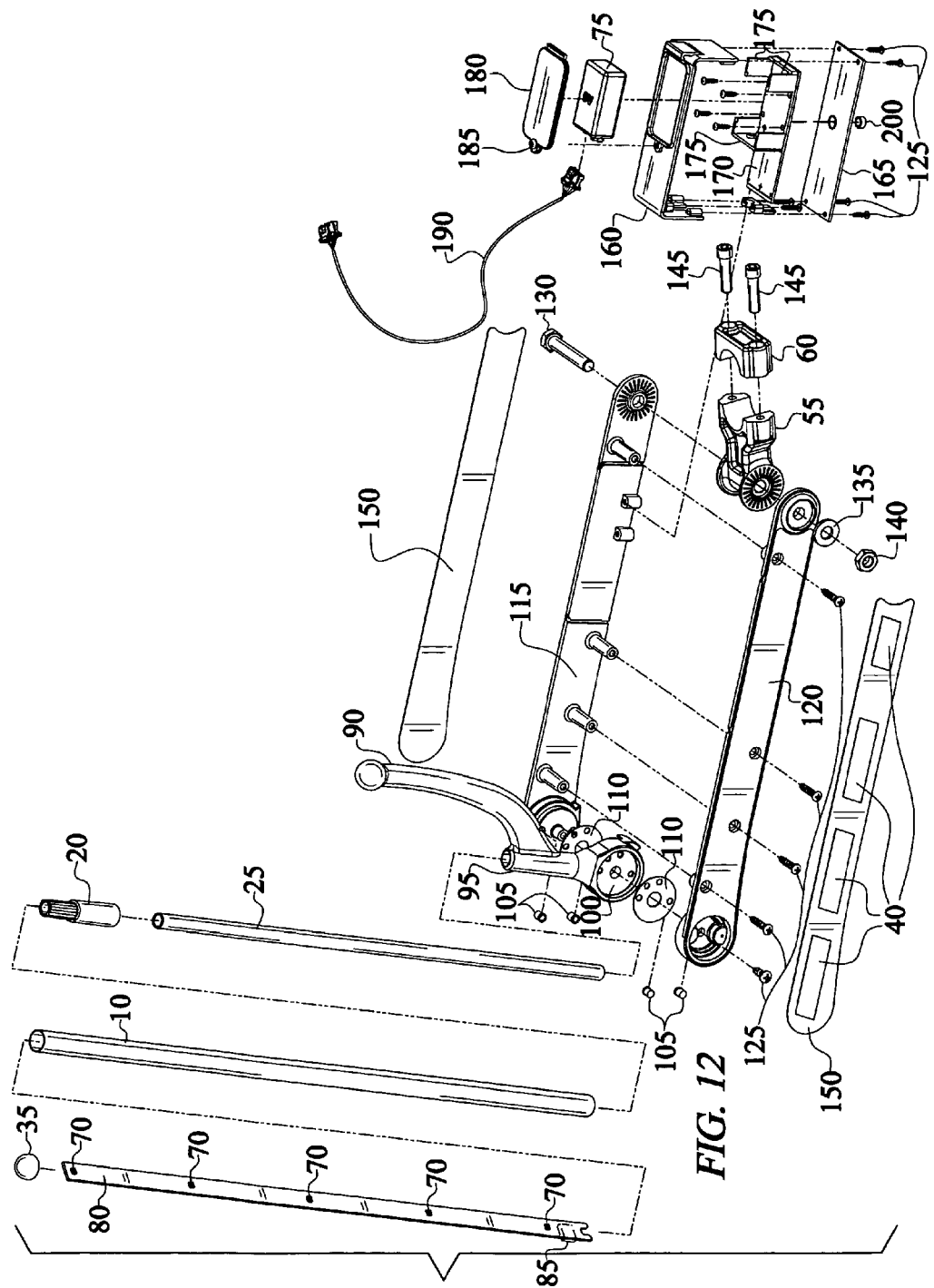
FIG. 12 is an exploded view of the base assembly and the mast in said embodiment of the invention.

FIG. 12 presents an exploded view of the illustrated embodiment of the invention. The mast 05 is comprised of a mast cap 35, tubular lens 10, mast connector 20, and mast extension tube 25. All these parts may be constructed of polycarbonate or other suitable materials. Optical clear Lexan® SLX polycarbonate, glass, or similar transparent or translucent material may be used for the tubular lens 10. A printed circuit board (PCB) 80 having five arrays of paired LEDs 70 positioned on either side of the board along its length, and a cable connector 85 attached to its lower end, is inserted into the tubular lens 10. The mast cap 35 is attached to one end of the tubular lens 10. The other end of the tubular lens 10 is attached to one end of the mast connector 20. The other end of the mast connector 20 is attached to one end of a mast extension tube 25. The other end of the mast extension tube 25 is then inserted into a mast mount 95 in the handle member 15, adjacent to a position handle 90. Epoxy or some other adhesive may be used to bond these connections securely.

The detent joint 65 located within the base assembly 30 may be a common spring-actuated lever and notched wheel design. The position handle 90 is mounted on a pivot point and in proximity to a notched wheel 100 located within the handle member 15. This allows the handle member 15 to rotate pivotally in 45-degree increments to a maximum angle of 90 degrees, as the position handle 90 is lifted or pushed out and over the top of each notch in the notched wheel 100. Spring plungers 105 are used to control incrementally the movement of the handle member 15. Wear plates 110 are positioned on either side of the notched wheel 100. The handle member 15, including its position handle 90, mast mount 95, and notched wheel 100, may be constructed of poly carbonate, metal, metal alloy, or other suitable materials.

The base assembly 30 may be formed by the mating of a main truss 115 and a secondary truss 120 about the handle member 15 at one end of the base assembly 30 and at the other end of the base assembly 30 about the seat clamp assembly 50, comprised of a seat clamp 55 and clamp cap 60. The trusses 115, 120 and the seat clamp assembly 50 may be made of polycarbonate, metal, metal alloy, or other suitable materials.

In the illustrated embodiment, hi-low thread-forming screws 125 are used to join securely the main truss 115 to the secondary truss 120, and to secure the handle member 15, but other suitable fastening means may be employed. The seat clamp 55 may be joined to the base assembly 30 by means of a hex bolt 130, flat washer 135, and jaw nut 140 or other fastening means that allow the seat clamp assembly 50 to pivot adjustably in relation to the base assembly 30. Fastening means—in the illustrated embodiment, head socket cap screws (HSCS) 145—are employed to secure the clamp cap 60 to the seat clamp 55. Reflective overlays 150 bearing reflective graphics 40 may be applied to the outside surface of each truss 115, 120 to enhance visibility of the base assembly 30 from either side of the bicycle.

As in this embodiment, a control box 155 may be located between the main truss 115 and the secondary truss 120 and between the seat clamp assembly 50 and the handle member 15 of the base assembly 30, and secured to the trusses 115, 120 via hi-low thread-forming screws 125 or other fastening means. In the illustrated embodiment, the control box 155 is formed, in part, by the joining of an upper segment 160 and lower segment 165 about a printed wiring assembly (PWA) 170 into which is integrated a microprocessor (not shown) and walls 175 for creating a battery compartment for a 9-volt battery 75 as a power source for the apparatus (although other means of powering the apparatus, including other types and numbers of batteries and configurations thereof, ranging from a total of 6 to 14 volts for direct current, may be employed).

The PWA 170 may have reverse polarity protection and brown-out protection. A battery cover 180, which may be fixed to the control box 155 with one or more removable screws 185 or other removable fastening means, ensures the battery 75 remains in place and allows access to change the battery 75. A cable 190, which may be a 16 con 28AWG 7-strand or similar cable, connects the battery 75 or other power source and the PWA 170 within the control box 155 to the cable connector 85 on the mast PCB 80, which enables each array of paired LEDs 70 located on the PCB 80 within the tubular lens 10 to be powered and controlled. A switch 200 may be located on the bottom of the control box 155, or in any other suitable location, turns the power to the device on or off.

What is claimed is:

1. An apparatus, comprising:
    an illuminable extruded tubular lens within a mast;
    at least one light emitting diode (LED) within said illuminable extruded tubular lens;
    a base assembly to which said mast is connected;
    mounting means incorporated into said base assembly for attaching said base assembly to a mounting point on a vehicle; and
    a handle member incorporated into said base assembly that, by means of a detent joint formed within the base assembly, allows said mast to be raised and lowered pivotally between a vertical operating position and a horizontal position parallel to a longitudinal frame of the vehicle on which the apparatus has been mounted.

2. The apparatus of claim 1 further comprises a control box incorporated into said base assembly with a printed wiring assembly into which is integrated a programmable microprocessor.

3. The apparatus of claim 2 further comprises a power source for said LED and the programmable microprocessor.

4. The apparatus of claim 3, the power source is a battery providing between 6 and 14 volts of direct current.

5. The apparatus of claim 4, the power source is a 9-volt battery.

6. The apparatus of claim 3 further comprises a switch for turning on and off said LED.

7. The apparatus of claim 1 further comprises two or more LEDs paired into an array within said illuminable extruded tubular lends.

8. The apparatus of claim 7, the arrays of two or more LEDs are capable of generating a plurality of light patterns.

9. The apparatus of claim 8, the plurality of light patterns are alternated automatically by said programmable microprocessor.

10. The apparatus of claim 7, the arrays of two or more LEDs produce different colors in a visible light range.

11. The apparatus of claim 1, the mounting point is a bicycle seat post, and the mounting means is a seat clamp assembly comprised of a seat clamp and a clamp cap.

12. The apparatus of claim 1, the detent joint within the base assembly is of a spring-actuated lever and notched wheel design.

13. The apparatus of claim 1, the vehicle is at least one of a motorcycle, a moped, a motor scooter, an all terrain vehicle (ATV), a snowmobile, or a tractor.

14. An apparatus, comprising:
    an illuminable extruded tubular lens within a mast;
    at least one light emitting diode (LED) within said illuminable extruded tubular lens;
    a base assembly to which said mast is connected;
    a control box with a printed wiring assembly into which is integrated a programmable microprocessor, a power source for said LED and the programmable microprocessor, and a switch for turning on and off said LED;
    mounting means incorporated into said base assembly for attaching said base assembly to a mounting point on a vehicle; and
    a handle member incorporated into said base assembly that, by means of a detent joint formed within the base assembly, allows said mast to be raised and lowered pivotally between a vertical operating position and a horizontal position parallel to the longitudinal frame of the vehicle on which the apparatus has been mounted.

15. The apparatus of claim 14 further comprises at least one reflective graphic attached to the base assembly.

16. The apparatus of claim 14 further comprises the LED produces at least one color in a visible light range.

17. The apparatus of claim 14, the mounting point is a bicycle seat post on a bicycle, and the mounting means is a seat clamp assembly comprised of a seat clamp and a clamp cap.

* * * * *